US012465930B2

(12) United States Patent
Yu

(10) Patent No.: US 12,465,930 B2
(45) Date of Patent: Nov. 11, 2025

(54) WATER SPRAY GUN HAVING SPRAY NOZZLE POSITIONING STRUCTURE

(71) Applicant: ZhongShan QingYi Metal Products Enterprise CO., LTD, ZhongShan (CN)

(72) Inventor: Tang Chieh Yu, Taichung (TW)

(73) Assignee: ZHONGSHAN QINGYI METAL PRODUCTS ENTERPRISE CO., LTD., Zhongshan (CN)

( * ) Notice: Subject to any disclaimer, the term of this patent is extended or adjusted under 35 U.S.C. 154(b) by 0 days.

(21) Appl. No.: 18/635,564

(22) Filed: Apr. 15, 2024

(65) Prior Publication Data

US 2025/0319480 A1 Oct. 16, 2025

(51) Int. Cl.
*B05B 15/65* (2018.01)
*B05B 1/16* (2006.01)

(52) U.S. Cl.
CPC ............ *B05B 1/1654* (2013.01); *B05B 15/65* (2018.02)

(58) Field of Classification Search
CPC ..... B05B 1/14; B05B 1/16-169; B05B 15/65; B05B 12/0022; B05B 12/0024
See application file for complete search history.

(56) References Cited

U.S. PATENT DOCUMENTS 4,903,897 A * 2/1990 Hayes .................... B05B 1/1654 239/394
5,540,386 A * 7/1996 Roman ............... B05B 12/0022 239/394
5,850,973 A * 12/1998 Liljeqvist .............. B05B 1/1636 239/312

* cited by examiner

*Primary Examiner* — Steven M Sutherland
(74) *Attorney, Agent, or Firm* — MUNCY, GEISSLER, OLDS & LOWE, P.C.

(57) ABSTRACT

A water spray gun having a spray nozzle positioning structure includes a gun body and a spray nozzle. The gun body has a water passage therein. The spray nozzle is rotatably connected to a front end of the gun body. A rear end face of the spray nozzle has a plurality of spaced recesses. A front end face of the gun body has an accommodating groove and an elastic member located in the accommodating groove. The elastic member includes a positioning head and at least two elastic legs. The positioning head is engaged in a corresponding one of the recesses when the spray nozzle is rotated. The elastic legs are inserted in the accommodating groove. When the positioning head is pressed, the elastic legs are elastically deformed outward for the positioning head to be moved backward and disengaged from the corresponding recess.

10 Claims, 4 Drawing Sheets

WATER SPRAY GUN HAVING SPRAY NOZZLE POSITIONING STRUCTURE

FIELD OF THE INVENTION

The present invention relates to a water spray gun, and more particularly, to a water spray gun having a spray nozzle positioning structure.

BACKGROUND OF THE INVENTION

A conventional water spray gun includes a rotatable spray nozzle for adjusting the water flow and spray pattern of water. In order to ensure the precise position of the spray nozzle, a positioning structure is disposed on the spray nozzle.

In general, the conventional positioning structure is composed of two accessories, namely, a spring and a positioning bead. Such a structure leads to fatigue of the spring after many switches and rotations in use, which easily causes the spring to break, resulting in the loss of the positioning function of the product. This not only affects the normal use of the product but also brings additional maintenance costs and inconvenience to consumers. Accordingly, the inventor of the present invention has devoted himself based on his many years of practical experiences to solve these problems.

SUMMARY OF THE INVENTION

The primary object of the present invention is to provide a water spray gun having a spray nozzle positioning structure, which is simple in structure and has better durability and reliability.

In order to achieve the foregoing object, the water spray gun provided by the present invention comprises a gun body and a spray nozzle. The gun body has a water passage therein. The spray nozzle is rotatably connected to a front end of the gun body. The spray nozzle has a plurality of spray holes. The spray holes are selectively in communication with the water passage to form different spray patterns when the spray nozzle is rotated.

A rear end face of the spray nozzle has a plurality of spaced recesses that are arranged around a rotation center of the spray nozzle. A front end face of the gun body has an accommodating groove and an elastic member located in the accommodating groove. The elastic member includes a positioning head and at least two elastic legs. The positioning head is engaged in a corresponding one of the recesses when the spray nozzle is rotated. The elastic legs are inserted in the accommodating groove.

When the positioning head is pressed, the elastic legs are elastically deformed outward for the positioning head to be moved backward and disengaged from the corresponding recess.

DETAILED DESCRIPTION OF THE PREFERRED EMBODIMENTS

Figure 1:
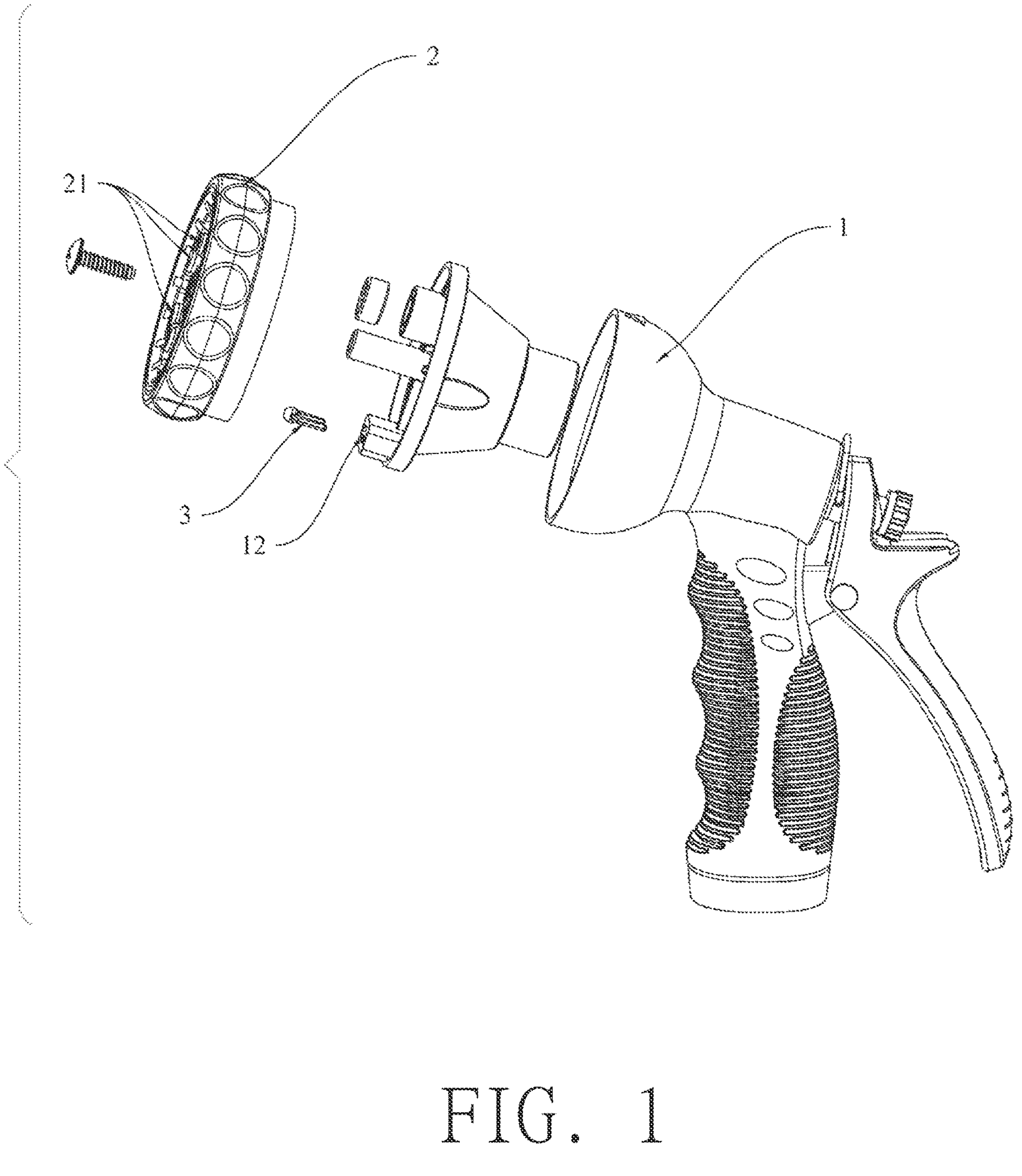
FIG. 1 is an exploded view of the present invention.
Figure 2:
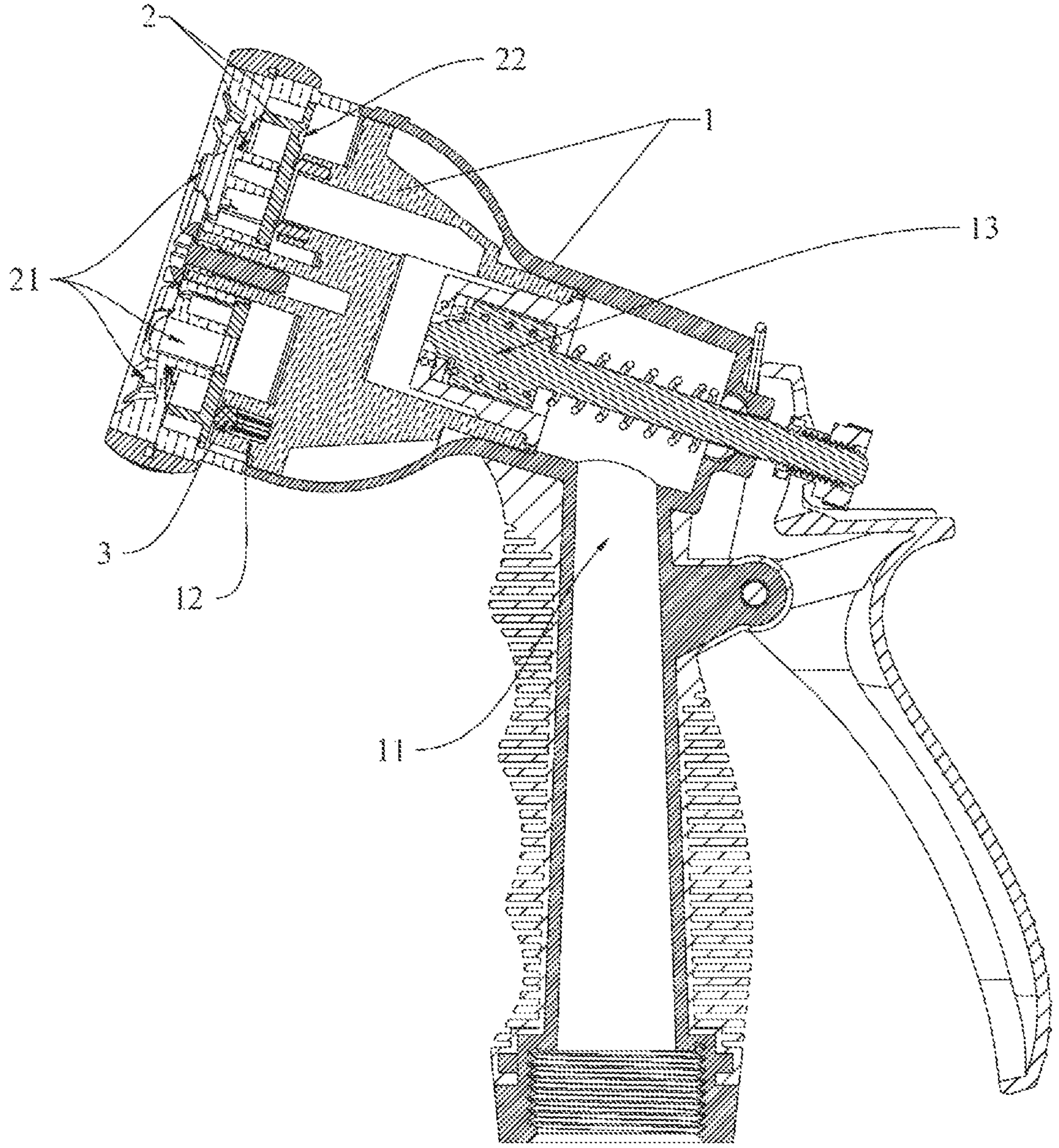
FIG. 2 is a cross-sectional view of the present invention.
Figure 3:
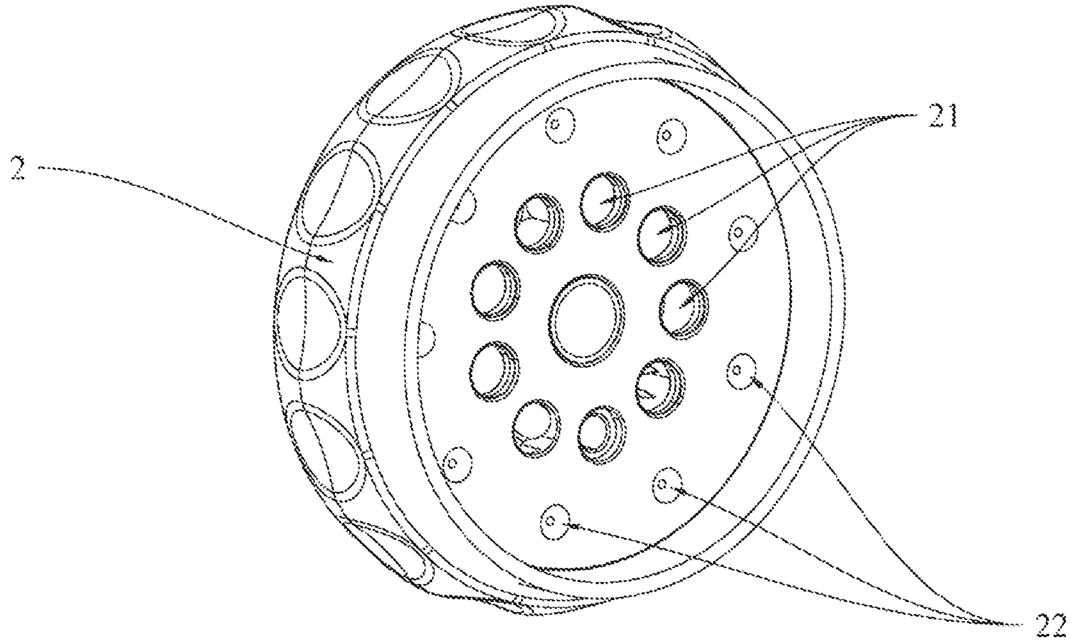
FIG. 3 is a perspective view of the spray nozzle of the present invention.
Figure 4:
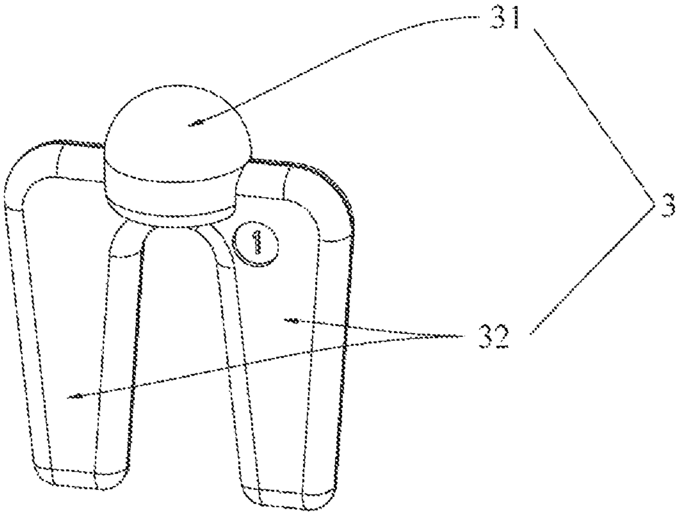
FIG. 4 is a perspective view of the elastic member of the present invention.
Figure 5:
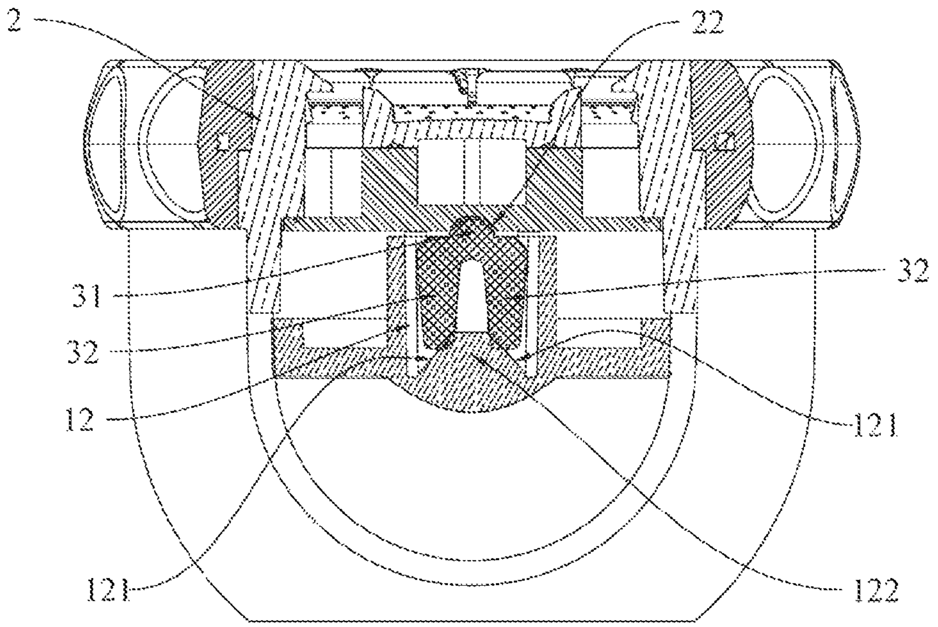
FIG. 5 is a first partial cross-sectional view of the present invention.
Figure 6:
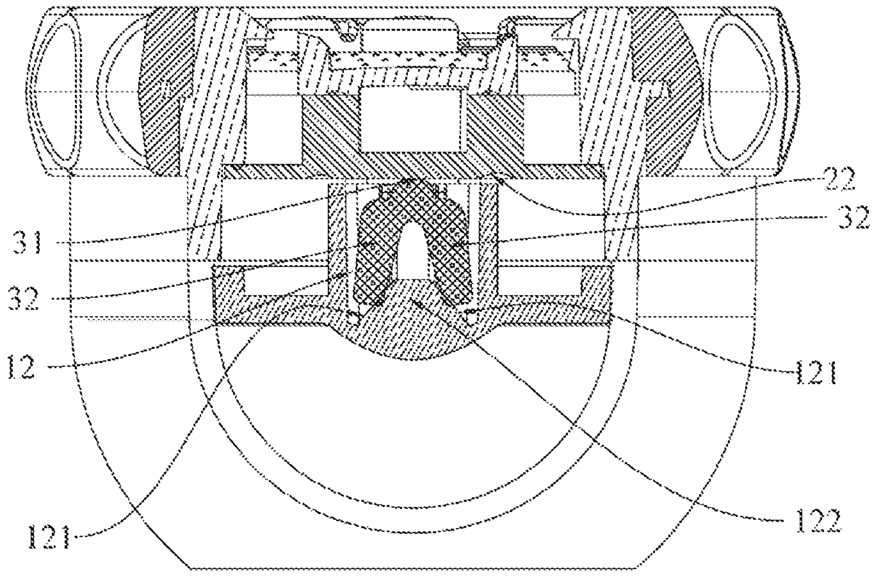
FIG. 6 is a second partial cross-sectional view of the present invention, wherein the elastic legs are deformed outward.

As shown in FIG. 1 through FIG. 6, the present invention discloses a water spray gun having a spray nozzle positioning structure, which provides a positioning structure that is simple in structure, has a long service life, and is highly stable.

The water spray gun comprises a gun body 1 and a spray nozzle 2 that is rotatably connected to the gun body 1. A water passage 11 is formed inside the gun body 1 for directing water. The spray nozzle 2 is rotatably connected to the front end of the gun body 1. The spray nozzle 2 has a plurality of spray holes 21. The spray holes 21 are selectively in communication with the water passage 11 to form different spray patterns when the spray nozzle 2 is rotated.

The rear end face of the spray nozzle 2 has a plurality of spaced recesses 22 that are arranged around the rotation center of the spray nozzle 2. The front end face of the gun body 1 has an accommodating groove 12 and an elastic member 3 located in the accommodating groove 12. The recesses 22 cooperate with the elastic member 3 to realize a positioning function.

The elastic member 3 is the main feature of the present invention. The elastic member 3 includes a positioning head 31 and at least two elastic legs 32. The combination of the positioning head 31 and the elastic legs 32 embodies an efficient mechanical design, providing durable and stable operating performances.

The positioning head 31 is engaged in one of the recesses 22 for positioning the spray nozzle 2. This physical fit provides clear positioning feedback while ensuring precise alignment each rotation, thereby ensuring the precision and stability of the spray nozzle 2 when switching water spray patterns. Regardless of manual adjustment by the user or fluctuations in water pressure, the positioning head 31 can maintain a stable position to ensure a consistent spray pattern.

It is worth noting that during the rotation of the spray nozzle 2, there is a clicking sound feedback when the positioning head 31 enters the recess 22, warning that it is in place.

The design of the elastic legs 32 enables the elastic member 3 to have excellent elastic deformation. When the spray nozzle 2 needs to be rotated to another one of the spray holes 21, the user can rotate the spray nozzle 2. During the rotation of the spray nozzle 2, the rear end face of the spray nozzle 2 will exert a force to move the positioning head 31 backward. (The positioning head 31 will be moved backward due to friction with the rear end face of the spray nozzle 2.) The elastic legs 32 are elastically deformed outward, thereby enabling the positioning head 31 to be disengaged from the current recess 22. At this time, the spray nozzle 2 can be freely rotated to the position of the next spray hole 21. Upon the positioning head 31 reaches the desired recess 22, the elastic legs 32 are restored by releasing the force, and the positioning head 31 is pushed again to be locked in the desired recess 22.

In addition, the structural design of the elastic legs 32 pays attention to the improvement of its fatigue resistance. During repeated use, the elastic legs 32 are subjected to very little elastic deformation rather than severe friction or impact, which reduces wear between components greatly. In contrast, conventional mechanical springs are prone to fatigue fractures because of frequent compression and release. Therefore, the design of the elastic legs 32 not only extends the service life of the elastic member 3 but also enhances the durability and reliability of the spray nozzle positioning structure of the water spray gun, providing the user with a better user experience.

The elastic member 3 may be integrally formed of a wear-resistant and flexible material, such as thermoplastic, silicone or synthetic rubber. As a result, possible metal fatigue and fracture problems of springs are avoided, which not only increases the durability of the positioning structure greatly but also reduces the costs and frequency of maintenance.

In the present invention, the elastic member 3 consisting of the positioning head 31 and the elastic legs 32 and the recess 22 are positioned in a cooperative manner without the use of springs. The service life the elastic member 3 is longer than the conventional structure consisting of a spring and a positioning bead. The product stability is better.

In addition, the design of the entire elastic member 3 simplifies the number of components, making the assembly easier and faster and reducing the complexity of production and assembly.

More specifically, in the present invention, the design of the accommodating groove 12 further facilitates the fine operation and efficient performance of the entire rotary positioning structure. The accommodating groove 12 not only serves as a storage space for the elastic member 3, but its bottom is designed to have a guide bevel 121 for operation of the elastic legs 32. The guide bevel 121 plays an important role in the function of the entire elastic member.

When the elastic member 3 is subjected to the force exerted by the rear end face of the spray nozzle 2 when it is rotated, the structural design of the guide bevel 121 ensures that the elastic legs 32 are displaced outward (elastically deformed outward). The displacement is accomplished by the bottom of the elastic leg 32 to be in contact with and move along the guide bevel 121. This allows the positioning head 31 to be smoothly disengaged from the current recess 22.

Specifically, the guide bevel 121 is a slope or tapered surface that gradually slopes upwardly toward the center from the bottom of the accommodating groove 12. The design of the slope may be linear, that is, it is inclined at a fixed angle toward the center. The conical surface provides a point-symmetric surface. The elastic legs 32 are evenly displaced outward regardless of which direction the elastic legs 32 are pressed in the accommodating groove. This design not only ensures stable displacement of the elastic legs 32 but also increases the reliability and durability of the whole mechanism.

When the elastic member 3 is no longer pressed, the guide bevel 121 also helps the elastic legs 32 return to its initial position smoothly. In this way, the elastic member 3 is ready for the next positioning action.

On the whole, the interaction between the elastic member 3 and the guide bevel 121 at the bottom of the accommodating groove 12 ensures the efficient operation and long-term durability of the spray nozzle positioning structure of the water spray gun.

Furthermore, an upward protrusion 122 is provided on the bottom of the accommodating groove 12. The guide bevel 121 disposed on the side of the protrusion 122.

More specifically, the positioning head 31 is a spherical head. This design allows the positioning head 31 to have a larger contact surface and more uniform force distribution when it is in contact with the recess 22, thereby reducing localized wear and optimizing positioning stability.

More specifically, the recess 22 is a curved recess, enabling the spherical positioning head 31 to be engaged in the recess 22 more accurately and smoothly. Since the shape of the curved surface matches the curved surface of the spherical positioning head 31, the contact area between the positioning head 31 and the recess 22 is larger. This design reduces wear and has a smooth guide effect when the spray nozzle 2 is rotated, especially when switching from one spray pattern to another.

More specifically, the recesses 22 are evenly distributed in a circle around the rotation center of the spray nozzle 2. This ensures that the user feels a consistent and balanced feedback when the spray pattern is adjusted. Each spray pattern selection is intuitive and easy to recognize. This even distribution means that the rotational force is consistent in any position. It is very user-friendly.

More specifically, the lower end of the elastic leg 32 is a filleted end. This design takes into account that sharp end may cause damage to the bottom of the accommodating groove 12 or other contact parts during repeated movements. The filleted end not only reduces the potential damage but also allows the elastic legs 32 to slide more smoothly along the guide bevel 121 when subjected to force, thereby reducing friction and resistance and improving the durability and reliability of the entire positioning structure.

More specifically, the gun body 1 further has a water valve 13 for controlling the water passage 11. The water valve 13 is responsible for precisely controlling the opening and closing of the water flow and for regulating the flow rate, thereby ensuring flexibility and versatility in use. The water valve 13 consists of a number of components, including a valve core, a core seat, a sealing ring, an operating lever, and so on, but not limited thereto. These components together form a mechanism that can quickly and accurately control the water flow passing through the water passage 11 in response to user operations.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A water spray gun having a spray nozzle positioning structure, comprising a gun body and a spray nozzle, the gun body having a water passage therein, the spray nozzle being rotatably connected to a front end of the gun body, the spray nozzle having a plurality of spray holes, the spray holes being selectively in communication with the water passage to form different spray patterns when the spray nozzle is rotated; and a rear end face of the spray nozzle having a plurality of spaced recesses that are arranged around a rotation center of the spray nozzle, a front end face of the gun body having an accommodating groove and an elastic member located in the accommodating groove, the elastic member including a positioning head and at least two elastic legs, the positioning head being engaged in a corresponding one of the plurality of spaced recesses when the spray nozzle is rotated, the at least two elastic legs being inserted in the accommodating groove, wherein, when the positioning head is pressed, the at least two elastic legs are elastically deformed outward for the positioning head to be moved backward and disengaged from the corresponding plurality of spaced recess, and wherein a guide bevel is formed on a bottom of the accommodating groove for guiding the at least two elastic legs to be deformed outward when the elastic member is pressed.

2. The water spray gun as claimed in claim 1, wherein the guide bevel is a slope or tapered surface that gradually slopes upwardly toward a center of the accommodating groove.

3. The water spray gun as claimed in claim 2, wherein an upward protrusion is provided on the bottom of the accommodating groove, and the guide bevel is disposed on one side of the protrusion.

4. The water spray gun as claimed in claim 1, wherein the plurality of spaced recesses are curved recesses.

5. The water spray gun as claimed in claim 1, wherein the positioning head is a spherical head.

6. The water spray gun as claimed in claim 5, wherein the plurality of spaced recesses are curved recesses.

7. The water spray gun as claimed in claim 1, wherein the plurality of spaced recesses are evenly distributed in a circle around the rotation center of the spray nozzle.

8. The water spray gun as claimed in claim 1, wherein the elastic member is integrally formed of a wear-resistant and flexible material.

9. The water spray gun as claimed in claim 1, wherein each of the at least two elastic legs each has a filleted lower end.

10. The water spray gun as claimed in claim 1, wherein the gun body further has a water valve for controlling the water passage.

* * * * *